United States Patent Office 3,239,551
Patented Mar. 8, 1966

3,239,551
CYCLIC SILOXAZANES
James G. Murray, Scotia, N.Y., assignor to General Electric Company, a corporation of New York
No Drawing. Filed May 21, 1962, Ser. No. 196,520
3 Claims. (Cl. 260—448.2)

This invention is concerned with novel compositions of matter (hereinafter referred to as "siloxazanes") selected from the class consisting of (a) 1,3,5,7-tetramethyl-1,3,5,7-tetraphenyl-4,8-dioxa-2,6-diazacyclooctasilane having the formula (I)
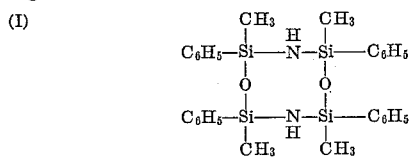

and (b) 2,6-di-n-butyl-1,1,3,3,5,5,7,7-octamethyl-4,8-dioxa-2,6-diazacyclooctasilane having the formula (II)
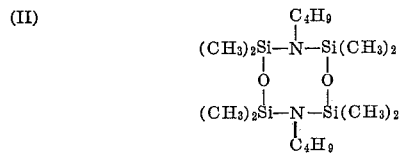

The aforesaid siloxazanes can be used as intermediates in the preparation of organopolysiloxane silicone rubbers. Thus, the siloxazanes can be reacted with from about 0.05 to about 1 percent, by weight, thereof of a siloxane rearrangement and condensation catalyst, e.g., alkali-metal hydroxides such as potassium hydroxide, cesium hydroxide, etc.; quaternary ammonium and phosphonium compounds for example, tetrabutyl ammonium hydroxide, tetrabutyl phosphonium hydroxide, etc., at temperatures of from about 100–175° C. for times varying from about 15 minutes to 2 hours or more, to convert the cyclic siloxazanes to high molecular weight polymers. These high molecular weight polymers can then be compounded with fillers such as, silica aerogel, fume silica, carbon black, etc., in amounts ranging, on a weight basis, from about 0.1 to 2 parts of filler per part of the organopolysiloxane gum and with the further addition of about 0.5 to 5 percent, by weight, thereof of a curing agent, such as benzoyl peroxide, and thereafter heated at elevated temperatures of from about 150–250° C. for times ranging from about 1 to 24 hours to give cured elastomeric products.

These cured products are useful as insulation for electrical conductors, as protective devices in equipment where resistance to heat and to depressed temperatures are an important requirement for the protective devices, etc. In addition these siloxazanes can also be used to treat various solid surfaces such as paper, cloth, electronic tubes, etc., to render the same water repellent and also to prevent undesirable electrical arcing as is usually the case when impurities and particles of dirt tend to collect on a surface subject to electrical discharge. In addition, these cyclic siloxazanes can be used to treat fillers which are to be incorporated in organopolysiloxane gums. By the treatment of these fillers, the undesirable formation of structure (i.e., nervy or rubbery characteristics of the filled compound) are materially reduced, thus allowing the combination of the filler and organopolysiloxane gum to be readily compounded at a later date with other additives such as curing agents normally employed for the purpose.

In order that those skilled in the art may better understand how the above composition may be prepared, the following examples are given by way of illustration.

EXAMPLE 1

The composition 1,3,5,7-tetramethyl-1,3,5,7-tetraphenyl-4,8-dioxa-2,6-diazacyclooctasilane was prepared by passing anhydrous ammonia into a solution of 74.6 grams of 1,3-dichloro-1,3-diphenyl-1,3-dimethyl disiloxane in 250 ml. benzene held at 20–30° C. for a period of about 3 hours. The product was filtered, the ammonium chloride washed with toluene and the solvent then removed from the filtrate under reduced pressure. The residue was heated on a steam bath for about 4 hours at 0.2 mm. Fractionation of the resulting fluid yielded 6.5 grams of a product of the above Formula I boiling at 200–206° C./0.1 mm., $n_D^{20}=1.5713$. Analysis of this compound showed it contained 5.5% nitrogen and had a molecular weight of 544, in contrast to the theoretical values of 5.18% nitrogen and a molecular weight of 542.93. The infrared spectra of the composition showed it to be consistent with the above-identified structure for Formula I.

In order to establish the radiation stability of the composition of Example 1, the latter was bombarded with beta (electron) radiation from a 1500 kv. resonant transformer at a current input of 200–500 microamperes to a total dose of $4 \times 10^8$ roentgens. As a result of this treatment, the viscosity of the compound had increased from 17 centistokes at 100° C. to 75 centistokes at 100° C., but there was no gelation of the sample. When a sample of an analogous siloxane, specifically, 1,3,5,7-tetraphenyl-1,3,5,7-tetramethylcyclotetrasiloxane was bombarded with only $2 \times 10^8$ roentgens, under similar conditions, it had almost completely gelled.

EXAMPLE 2

The composition 1,1,3,3,5,5,7,7-octamethyl-4,8-dioxa-2,6-diazacyclooctasilane having the formula (III)
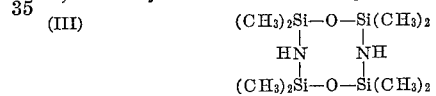

was prepared by passing ammonia into a solution of 58.4 grams of 1,3-dichlorotetramethyldisiloxane in 150 ml. benzene while maintaining the solution at room temperature. When no more ammonia was adsorbed, the solution was allowed to stand about 18 hours and the solution was filtered and the benzene removed by distillation on a steam bath. Heating on the steam bath was continued for 2 hours more to condense any unreacted silyl amines. The residue was then distilled under reduced pressure to yield 7.7 grams of the above-identified composition represented by Formula III boiling at 98–101° C./13.6 mm.; this material had a melting point of 38.5–39.5° C. Analysis of the composition showed it to contain 9.3% nitrogen and to have a molecular weight of 280, as contrasted to the theoretical values of 9.54% nitrogen and a molecular weight of 294.67. The infrared spectra of the product was found to be consistent with the above-identified structure. The compound 2,6-di-n-butyl-1,1,3,3,5,5,7,7 - octamethyl-4,8-dioxa-2,6-diazacyclooctasilane was prepared by heating at reflux temperature for 17 hours a mixture comprising 18.7 grams of the composition having the Formula III (prepared above) with 18.7 grams n-butylamine and 0.3 gram anhydrous cupric bromide. The reaction mixture was then distilled to remove a product boiling at about 75° C. at atmospheric pressure. The pressure was then reduced to 132 mm. and the residue in the reaction vessel was heated at 170° C. for 2 hours, during which time an additional 6.2 grams of material was removed by distillation. The residue was then distilled at 0.3 mm. to yield 9.9 grams of a material which when redistilled yielded the essentially pure product of Formula II boiling at 95–98° C./0.25 mm. Analysis of the compound showed it to contain 7.1% nitrogen and to have a molecular weight of 403 as contrasted to the theoretical values of 6.89% nitrogen and a molecular weight of 406.88. The infrared spectra was consistent with the above-described structure.

One of the particular advantages of compositions described above having bulky groups, namely, the phenyl groups on the silicon atoms or the n-butyl group on the nitrogen atom is the fact that the resistance to hydrolysis is materially improved by the presence of such groups. To establish this fact, the hydrolytic stability of several materials containing the silazane grouping

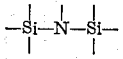

was measured by dissolving 0.5 equivalent of the silazane composition in dimethyl formamide containing 3 equivalents of water per liter of dimethyl formamide. The mixture was then allowed to stand for varying lengths of time and the disappearance of the silazane band determined by means of infrared examination. The following Table I shows the compounds which were tested as well as the rate of loss of the silazane band.

Table I

| Compound | Rate of loss of silazane band |
| --- | --- |
| $(CH_3)_2Si\underset{NH}{\overset{Si(CH_3)_2}{\diagup\diagdown}}N\underset{}{\diagdown\diagup}Si(CH_3)_2$ | Almost complete loss in 46 minutes. |
| $(CH_3)_2Si\underset{HN}{\overset{H}{-}}N-Si(CH_3)_2$ $(CH_3)_2Si\underset{}{-}N-Si(CH_3)_2$ $\phantom{xxxxx}H$ $\phantom{xxx}NH$ | Band about one-third gone in 40 minutes. |
| $(CH_3)_2Si-O-Si(CH_3)_2$ $\phantom{x}HN\phantom{xxx}NH$ $(CH_3)_2Si-O-Si(CH_3)_2$ | Slight change in 13 hours. |
| Composition of Formula I | No change in 25 hours. Slight change after 10 days. |
| Composition of Formula II | No change in 7 days. |

It will be noted that the compositions of the instant invention, where there are bulk phenyl groups on the silicon adjacent to nitrogen or where there is a bulk butyl group on the nitrogen atom, even through there are no bulk groups on the silicons adjacent the nitrogen atoms, were more stable than the silazane compositions which did not have bulk groups in the positions recited above.

What I claim as new and desire to secure by Letters Patent of the United States is:

1. A composition of the matter selected from the class consisting of (a) 1,3,5,7-tetramethyl-1,3,5,7-tetraphenyl-4,8-dioxa-2,6-diazacyclooctasilane having the formula

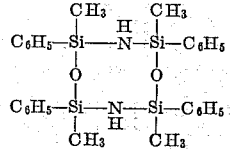

and (b) 2,6-di-n-butyl-1,1,3,3,5,5,7,7-octamethyl-4,8-dioxa-2,6-diazacyclooctasilane having the formula

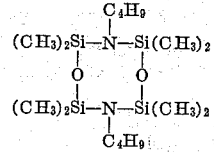

2. The composition 1,3,5,7-tetramethyl-1,3,5,7-tetraphenyl-4,8-dioxa-2,6-diazacyclooctasilane having the formula

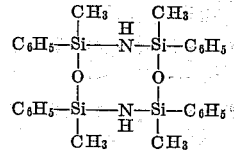

3. The composition 2,6-di-n-butyl-1,1,3,3,5,5,7,7-octamethyl-4,8-dioxa-2,6-diazacyclooctasilane having the formula

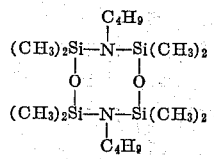

References Cited by the Examiner

UNITED STATES PATENTS 2,676,163   4/1954   Speier _____ 260—448.2
2,865,918   12/1958  Hurwitz et al. _____ 260—448.2

OTHER REFERENCES

Sokolov: 54 Chem. Abstr. 8,603 (1960).
Sokolov: "Zhurnal Obshcheii Khim, SSSR," volume 29, 1959, pages 258–63.

TOBIAS E. LEVOW, *Primary Examiner.*

SAMUEL H. BLECH, *Examiner.*